US006546205B1

(12) United States Patent
Yamaguchi et al.

(10) Patent No.: US 6,546,205 B1
(45) Date of Patent: Apr. 8, 2003

(54) CHARGING CIRCUIT AND ACCOMPANYING EQUIPMENT

(75) Inventors: Takehisa Yamaguchi, Ikoma (JP); Satoshi Yokota, Toyonaka (JP); Yasushi Iijima, Sakai (JP)

(73) Assignee: Minolta Co., Ltd., Osaka (JP)

( * ) Notice: Subject to any disclaimer, the term of this patent is extended or adjusted under 35 U.S.C. 154(b) by 1070 days.

(21) Appl. No.: 08/593,459

(22) Filed: Jan. 29, 1996

(30) Foreign Application Priority Data

Jan. 30, 1995 (JP) .......................................... 7-012498

(51) Int. Cl.[7] .............................................. G03B 7/26
(52) U.S. Cl. ..................................... 396/205; 396/277
(58) Field of Search ........................... 354/418, 127.1, 354/127.11, 127.12, 145.1; 315/241 R, 241 P; 320/1; 396/205, 206, 277, 278, 301

(56) References Cited

U.S. PATENT DOCUMENTS 3,541,420 A * 11/1970 Rees ............................ 320/1
4,145,637 A * 3/1979 Giese ..................... 315/241 P
4,150,306 A * 4/1979 Hauenstein ............. 315/241 P
4,270,079 A * 5/1981 Ikawa ........................... 320/1
4,519,683 A * 5/1985 Hagyuda et al. ....... 354/127.11
4,566,769 A * 1/1986 Inoue ......................... 396/205
4,737,806 A * 4/1988 Sakaguchi et al. ....... 354/145.1
5,016,038 A * 5/1991 Kobayashi et al. ......... 354/418
5,023,470 A * 6/1991 Onozuka et al. ............ 307/108
5,034,662 A * 7/1991 Nishida et al. .......... 315/241 P
5,045,876 A * 9/1991 Aihara ....................... 396/206
5,250,978 A * 10/1993 Ogawa ....................... 354/418
5,264,895 A * 11/1993 Takahashi et al. .......... 396/206
5,384,518 A * 1/1995 Kido et al. ............. 315/241 R
5,432,410 A * 7/1995 Yamada et al. .......... 315/241 P
5,668,445 A * 9/1997 Matsui ................... 315/241 P
5,717,308 A * 2/1998 Nishitani et al. ........... 396/301

* cited by examiner

*Primary Examiner*—Christopher Mahoney
(74) *Attorney, Agent, or Firm*—Burns, Doane, Swecker & Mathis, LLP

(57) ABSTRACT

A charging circuit detects a battery voltage Vp and a charging voltage of a main condenser. When a charge of the condenser is instructed, if the battery voltage is smaller than prescribed value Vpo, the charge is performed in a single control mode. And then, when the charging voltage of the main condenser is larger than a prescribed value Vco, the mode is changed to a push-pull control mode from the single control mode. When the charge of the condenser is instructed, if the battery voltage is larger than prescribed value Vpo, the charge is performed in a push-poll control mode independent of the charging voltage.

18 Claims, 10 Drawing Sheets

CHARGING CIRCUIT AND ACCOMPANYING EQUIPMENT

BACKGROUND OF THE INVENTION

1. Field of the Invention

The present invention pertains to a charging circuit that performs charging of a prescribed load and to equipment accompanying this charging circuit, said charging circuit being used, for example, in a flash light device, a camera with a built-in flash, a measuring device using flash light, or a battery charger.

2. Description of the Related Art

The circuit shown in FIG. 12 is one example of a conventional charging circuit, and is used as a charging circuit for a built-in flash in a camera. This circuit comprises step-up transformer 100, power supply battery 101, main condenser 102 for flash light emission, FET (field effect transistor) 103 and diode 104. FET 103 is placed in series with primary coil L1 of step-up transformer 100, and pulse signals having a certain frequency are input from drive control circuit 105 to gate G of said FET 103. The periodic turning ON and OFF of FET 103 periodically turns ON and OFF the application of primary voltage El to primary coil L1 of step-up transformer 100 such that AC (alternating current) secondary voltage Vf is applied to secondary coil L2.

AC secondary current I2 output by means of the secondary voltage Vf is rectified by diode 104 and supplied to main condenser 102 such that main condenser 102 is intermittently charged. When charging voltage Vh of main condenser 102 has reached a prescribed final level, the output of said pulse signals by drive control circuit 105 is stopped and the charging operation comes to an end.

In the charging circuit described above, where one battery is shared for the charging circuit and for the operation of the camera main unit, if a sudden step-up of voltage is made to take place in a condition where the battery has been consumed and its voltage is relatively low, the battery voltage will suddenly decrease, which may cause problems in the supply of power to other circuits of the camera. Even if the battery is not shared between the charging circuit and the camera main unit, if load is applied suddenly in a condition in which the battery has been consumed, the battery voltage will decrease suddenly, which may cause a problem with the charging circuit itself. Conversely, if charging is performed slowly so that the load is light, charging must be performed over a long period of time.

SUMMARY OF THE INVENTION

The object of the present invention is to provide a charging circuit in which the charging time may be reduced and in which a sudden decrease in battery voltage during charging may be prevented, such that problems in the operation of circuits may be prevented.

Another object of the present invention is to provide equipment accompanying the charging circuit in which no problem occurs in the power supply to circuits other than the charging circuit due to a sudden decrease in battery voltage during charging.

Yet another object of the present invention is to provide equipment accompanying the charging circuit in which the charging time may be reduced and problems in the operation of the equipment due to a sudden decrease in battery voltage during charging may be prevented.

BRIEF DESCRIPTION OF THE DRAWINGS

These and other objects and features of this invention will become clear from the following description, taken in conjunction with the preferred embodiments with reference to the accompanied drawings, in which.

DETAILED DESCRIPTION OF THE PREFERRED EMBODIMENTS

A flash device and a camera with a built-in flash are shown as examples of the charging circuit of the present invention and accompanying equipment in this description. However, the present invention may be used in other equipment in which flash light is used, such as measuring devices and battery chargers.

Figure 1:
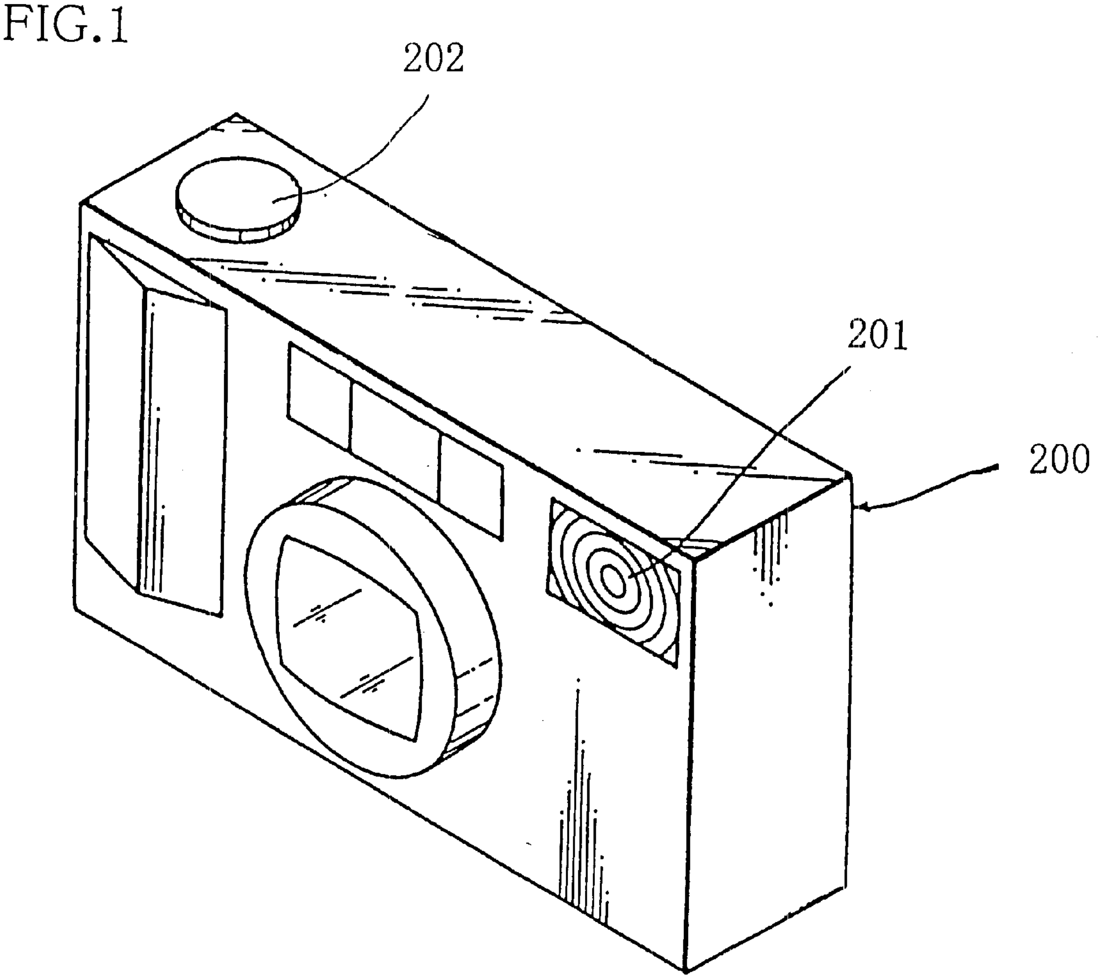
FIG. 1 shows the appearance of a camera with a built-in flash, which comprise the first embodiment of the present invention.
Figure 2:
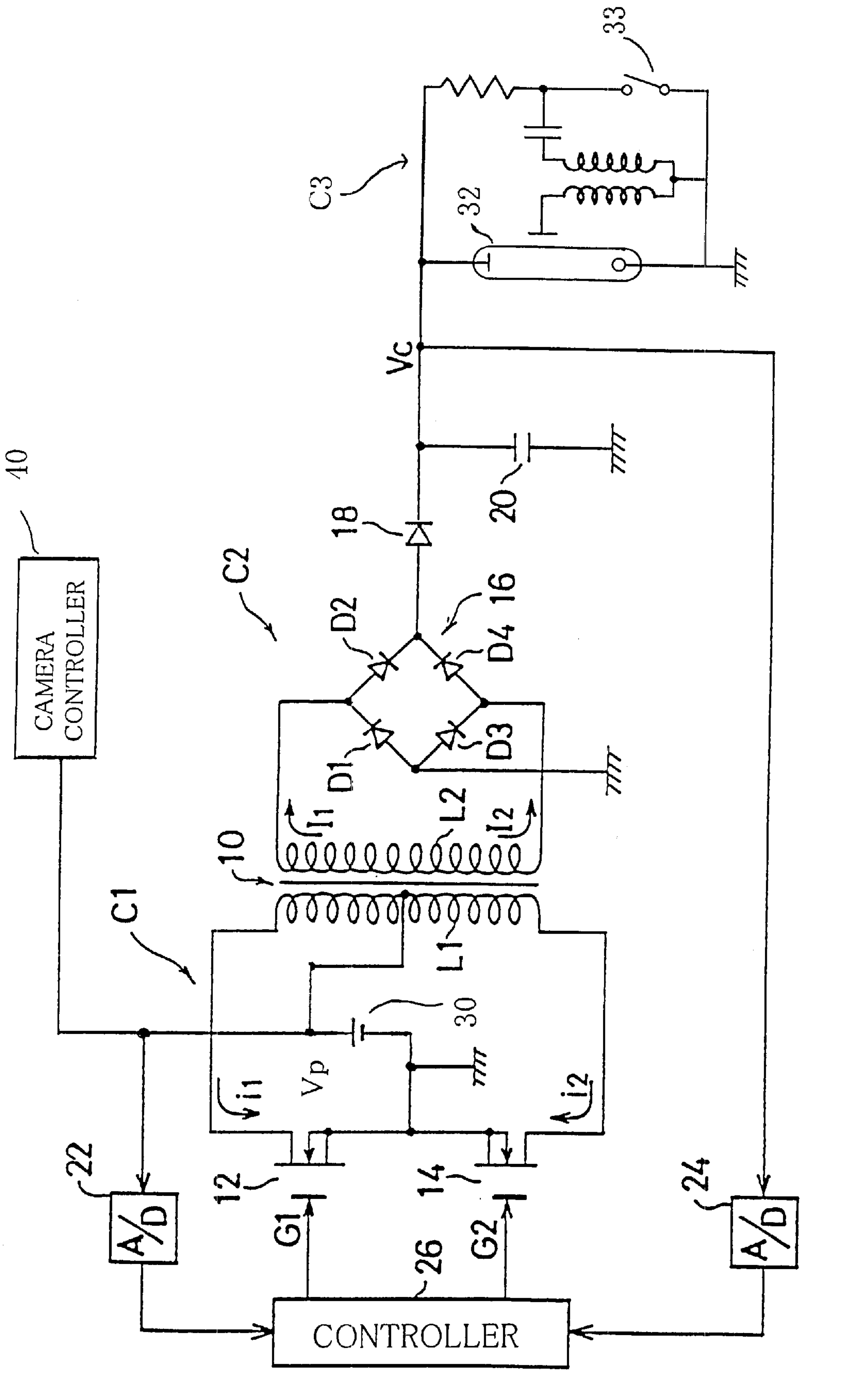
FIG. 2 is a circuit diagram showing a flash charging circuit in the first embodiment of the present invention.

The first embodiment of the present invention is explained with reference to FIGS. 1 through 8. FIG. 1 shows the appearance of a camera with a built-in flash, which comprise the first embodiment of the present invention. It is a camera of the type in which camera main unit 200 and the flash device are built as one integral unit, and has flash light emission window 201. FIG. 2 shows a charging circuit for the flash device built into said camera. This flash charging circuit comprises step-up transformer 10. Primary coil circuit C1 and secondary coil circuit C2 are connected to both ends of primary coil L1 and both ends of secondary coil L2 of said step-up transformer, respectively. Primary coil circuit C1 has switch elements 12 and 14, each comprising a MOS-type FET, on either end of primary coil L1, and the connection between switch elements 12 and 14 is grounded. Voltage (battery voltage) Vp is applied to the center of primary coil L1 by battery 30.

The power supply battery for the camera's controller 40 that controls the operations of the camera main unit of this embodiment, such as film winding/rewinding, lens drive, light measurement and exposure is used as the battery described above. For elements 12 and 14, various semiconductor switch elements other than said MOS-type FETs, such as connection-type FETs and silicon transistors, may be used.

Secondary coil circuit C2 has diode bridge circuit 16 comprising four diodes D1 through D4, for example, as a full-wave rectifying means, and diode 18 and main condenser 20 to accumulate the charge for flash light emission are located between the output terminal of this diode bridge circuit 16 and the ground. The charge accumulated in main condenser 20 is provided to light emission circuit C3 containing discharge tube 32 and trigger switch 33.

Discharge tube 32 is placed just inside flash light emission window 201 as shown in FIG. 1. When shutter release button 202 is operated after preparation for light emission is complete, a signal is sent to trigger switch 33, whereby discharge tube 32 emits light and the exposure sequence simultaneously takes place.

Figure 3A:
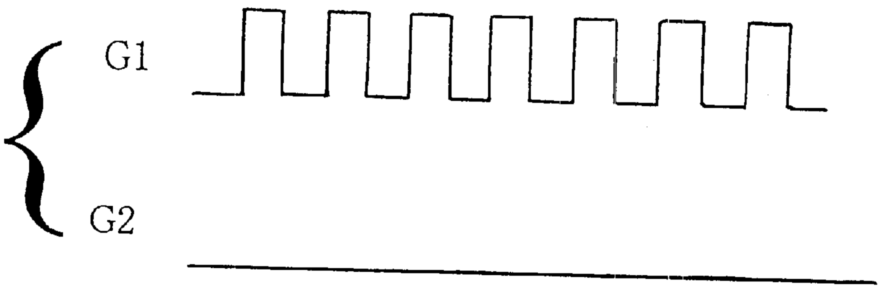
FIG. 3*a* is a waveform chart showing the pulse signals that are input to the gates of switch elements during single control in the first embodiment.
Figure 3B:
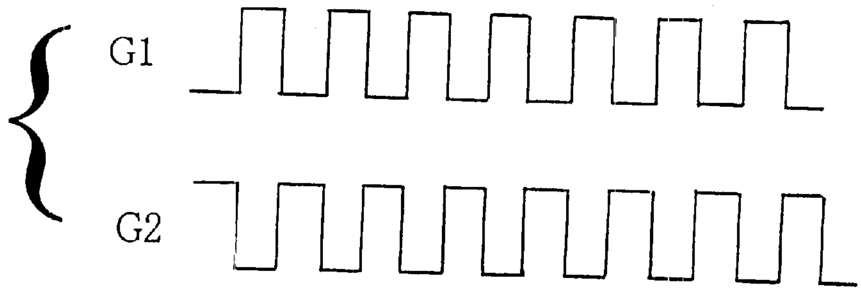
FIG. 3*b* is a waveform chart showing pulse signals that are input to the gates of switch elements during push-pull control in the first embodiment.
Figure 4:
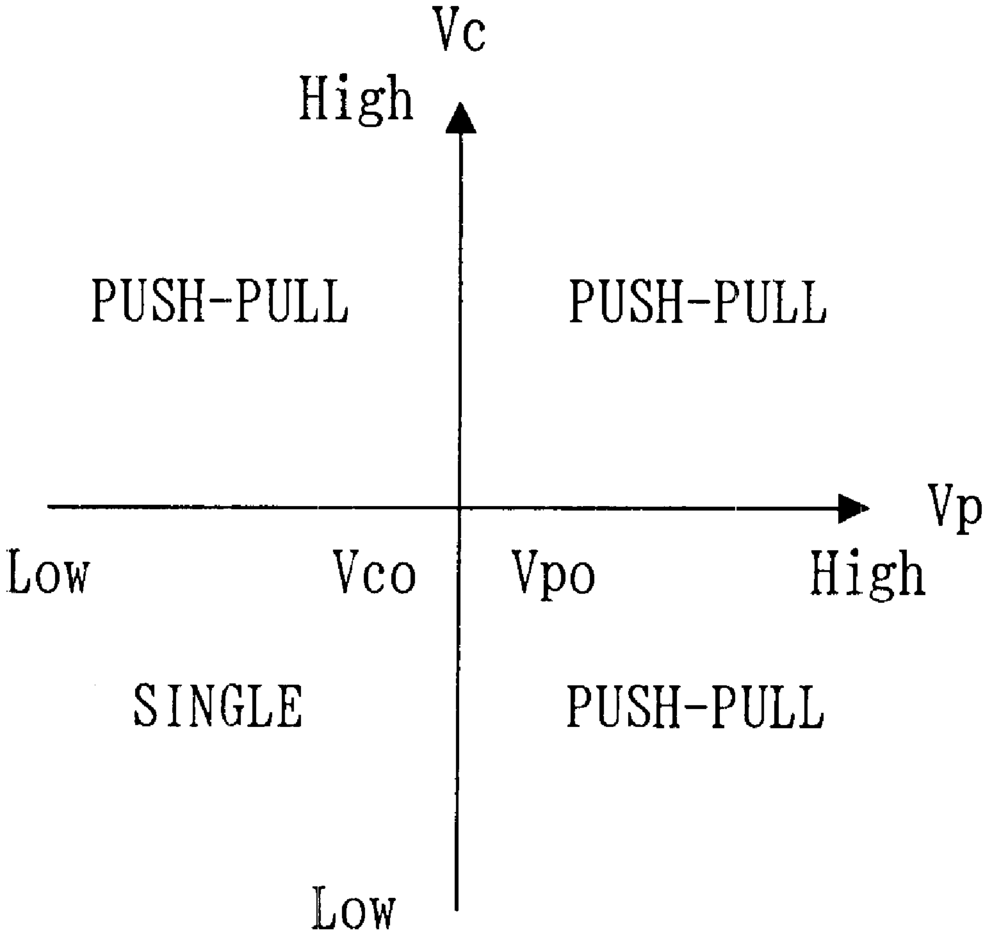
FIG. 4 is an illustration to explain the relationships among the battery voltage, charging voltage and control method in the first embodiment.

Said battery voltage Vp and charging voltage Vc which comprises voltage between both ends of main condenser 20, are input to controller 26, a control means, via A/D converters 22 and 24, respectively. This controller 26 comprises a CPU (central processing unit) or a CPU together with various circuits such as an oscillation circuit. By inputting pulse signals to gates G1 and G2 of FETs 12 and 14, it drives FETs 12 and 14 ON and OFF and at the same time also performs the following control operations depending on said voltages Vp and Vc.

a) Where battery voltage Vp is smaller than prescribed value Vpo that is set in advance and charging voltage Vc is also smaller than prescribed value Vco: Here, as shown in FIG. 3*a*, pulse signals are output to gate G1 of FET 12 only so that only FET 12 is driven ON and OFF and FET 14 is kept OFF at all times. Naturally, a reverse operation in which FET 14 is driven ON and OFF while FET 12 is kept OFF at all times may also be used. Hereinafter the control method in which only one of the FETs is driven in this manner is called 'single control'.

b) Where battery voltage Vp is equal to or larger than said prescribed value Vpo, or where charging voltage Vc is equal to or larger than said prescribed value Vco: Here, as shown in FIG. 3*b*, pulse signals are output to gates G1 and G2 of FETs 12 and 14 with a mirror-image phase (in other words, when the signal for one FET is ON, the signal for the other FET is OFF) such that so-called 'push-pull' control is performed, in which FETs 12 and 14 are alternately driven ON and OFF.

The relationships among battery voltage Vp, charging voltage Vc and the single and push-pull control methods described above is shown in FIG. 4.

Figure 8:
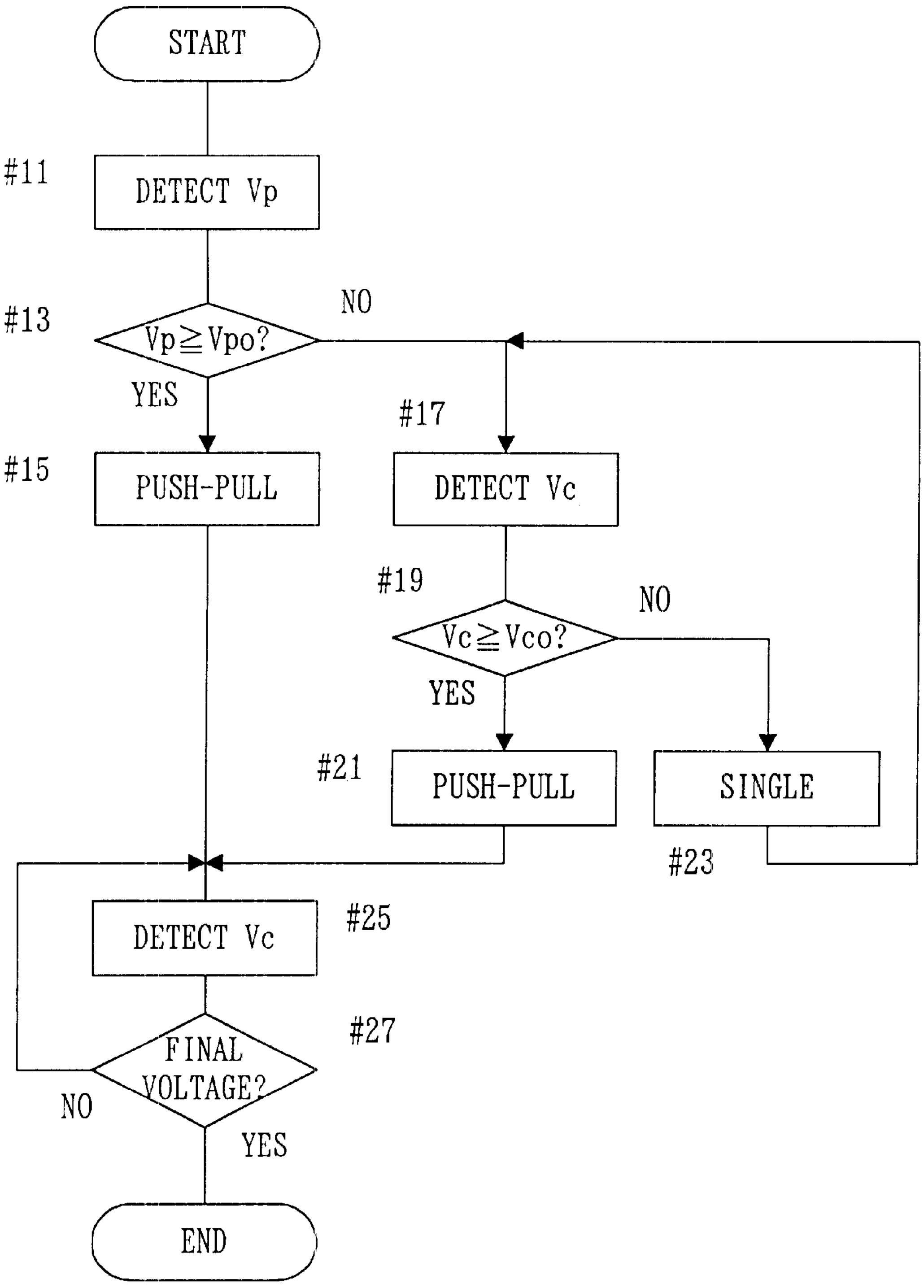
FIG. 8 is a flow chart showing the control of the charging by a controller in the first embodiment.

The operation of this circuit will now be explained with reference to the flow chart in FIG. 8. When an instruction to charge main condenser 20 to prepare for flash light emission is input, battery voltage Vp is detected (#11) and is compared with prescribed value Vpo (#13). Where the battery is only slightly consumed and battery voltage Vp is equal to or larger than prescribed value Vpo, controller 26 generates pulse series signals set to a prescribed frequency with a duty ratio of 50%, for example, in order to perform push-pull control in #15, and outputs the signals to gates G1 and G2 of FETs 12 and 14 while alternating the mirror-image phase.

In other words, while FET 12 is ON, FET 14 is OFF. Therefore, primary current i1 flows from primary coil L1 to FET 12 while this is occurring. As a result, secondary voltage that causes secondary current I1 to flow from secondary coil L2 to the connection between diodes D1 and D2 is applied to secondary coil L2, and said secondary current I1 is input to main condenser 20 after being full-wave rectified by diode bridge circuit 16.

On the other hand, while FET 12 is OFF, FET 14 is ON. Therefore, primary current i2 flows from primary coil L1 to FET 14 while this is occurring. As a result, secondary voltage that causes secondary current I2 to flow from secondary coil L2 to the connection between diodes D3 and D4 is applied to secondary coil L2, and said secondary current I2 is input to main condenser 20 after being full-wave rectified by diode bridge circuit 16.

Therefore, the alternate turning ON and OFF of FETs 12 and 14 alternately causes positive and negative secondary voltage to be applied to either end of secondary coil L2, and secondary currents I1 and I2 that are generated via this secondary voltage are full-wave rectified by diode bridge circuit 16 and continuously supplied to main condenser 20. The continuous supply of these secondary currents I1 and I2 causes main condenser 20 to accumulate charge quickly and charging voltage Vc of main condenser 20 increases rapidly. This charging voltage Vc is detected by controller 26, and when it has reached prescribed final voltage level Vc1, controller 26 determines that the charging has been completed, thereby stopping the output of pulse signals to FETs 12 and 14 and ending the charging operation (#25, #27).

On the other hand, where the battery is substantially consumed and battery voltage Vp is smaller than prescribed value Vpo when said charge instruction is input (NO in #13), there is a possibility that the supply of power to the camera's other circuits may be hindered due to a decrease in voltage caused by the charging. Therefore, push-pull control which entails a sudden load is not performed when the charging starts. The process advances to step #17 where charging voltage Vc of the condenser is detected and it is determined whether or not charging voltage Vc is equal to or larger than prescribed value Vco (#19). Since the charging voltage is low when the charging starts, the process advances to step #23 where charging starts using single control. Controller 26 outputs pulse series signals set at a prescribed frequency with a duty ratio of 50% to one of the FETs. Here it outputs pulse signals to gate G1 of FET 12 only. As a result, only FET 12 is driven ON and OFF while FET 14 is kept OFF.

Therefore, where only one of the FETs, namely FET 12, is driven as described above, secondary voltage is caused to be applied to secondary coil L2 during only the time that FET 12 is ON, and single control is performed in which charging of main condenser 20 takes place. Such single control slows down the charging speed in comparison with the push-pull control in which FETs 12 and 14 are alternately turned ON and OFF, and a charging operation takes place in which a sudden decrease in battery voltage Vp caused by a sudden step-up of voltage can be prevented.

When charging voltage Vc has reached or exceeded prescribed value Vco (#17, #19), the process advances to step #21 and the control is switched to push-pull control. The charging operation using push-pull control that started in step #15 or step #21 continues until charging voltage Vc reaches prescribed final voltage level Vc1 (#25, #27).

Figure 5:
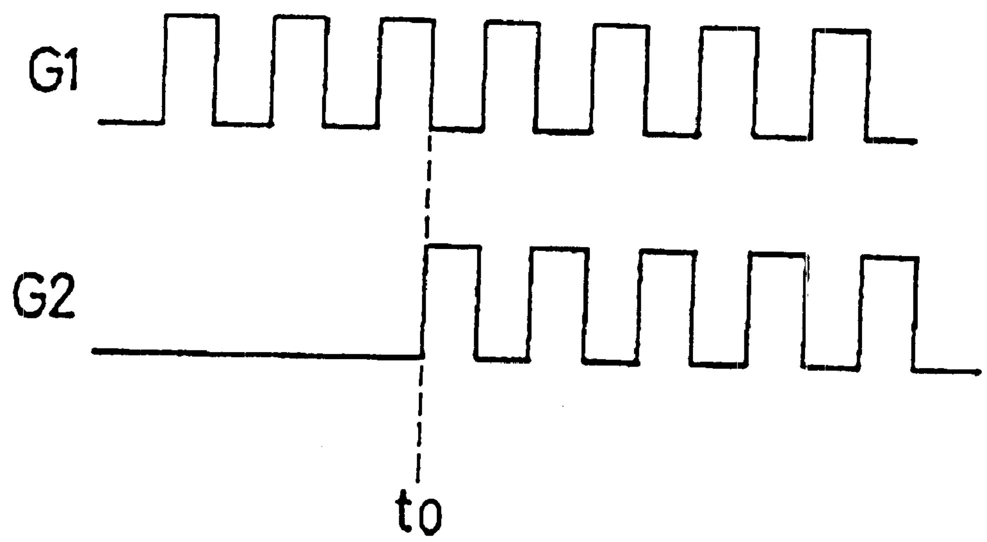
FIG. 5 is a waveform chart showing pulse signals that are input to the gates of switch elements when the control is switched from single control to push-pull control in the first embodiment.
Figure 6:
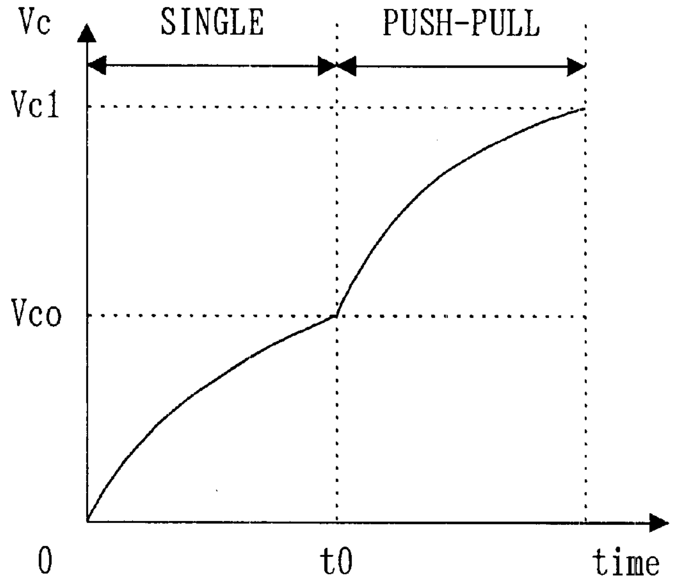
FIG. 6 is an illustration showing the changes in the charging voltage of a condenser over time in the first embodiment.

The relationship between changes in charging voltage Vc over time and the switching between single control and push-pull control is explained with reference to FIGS. 5 and 6. If it is assumed that the time when charging voltage Vc of main condenser 20 reaches prescribed value Vco (which is smaller than final voltage Vc1) is t0, single control is used until time t0 so that power supply to the charging circuit and the circuits of the camera main unit is not hindered due to a sudden decrease in the battery voltage. When charging voltage Vc has reached prescribed value Vco (at time t0), charging is performed using push-pull control because the load decreases and a sudden decrease in battery voltage is less likely to occur.

First, FET 12 is driven ON and OFF using single control while FET 14 is kept OFF. While charging takes place slowly, when charging voltage Vc has reached prescribed voltage Vco which is smaller than said final voltage Vc1 (see time t0 in FIG. 6), or namely, when the charging load has been reduced substantially and a sudden decrease in battery voltage Vp is less likely to occur, controller 26 switches from single control to push-pull control, where it outputs pulse signals to both FETs 12 and 14 (see FIG. 5) and the charging speed of main condenser 20 increases. When charging voltage Vc has reached said final voltage Vc1, controller 26 stops the output of pulse signals and ends the charging operation.

As described above, in the circuit of this embodiment, where battery voltage Vp is smaller than prescribed value Vpo, or in other words, where a sudden decrease in battery voltage Vp is relatively likely to occur, single control is used, such that the total period of time in which both FETs 12 and 14 are ON is short. On the other hand, where battery voltage Vp is equal to or larger than prescribed value Vpo, or in other words, where a sudden decrease in battery voltage Vp is relatively less likely to occur, so-called push-pull control is used, such that the total period of time in which both FETs 12 and 14 are ON is long. Therefore, where battery voltage Vp is relatively high, charging takes place while the charging time is being reduced. On the other hand, where battery voltage Vp is relatively low, no sudden charging takes place, as a result of which a sudden decrease in battery voltage Vp is prevented, and therefore a failure in the supply of power to the camera's other circuits or to the charging circuit itself is prevented.

Furthermore, where battery voltage Vp is smaller than prescribed value Vpo, when charging voltage Vc of main condenser 20 becomes equal to or larger than prescribed value Vco, or in other words, when the charging load is relatively light, the control method is switched to said push-pull control so that the total period of time in which both FETs 12 and 14 are ON becomes long. By doing so, a sudden decrease in battery voltage may be prevented and at the same time the charging time may be further reduced.

Figure 7:
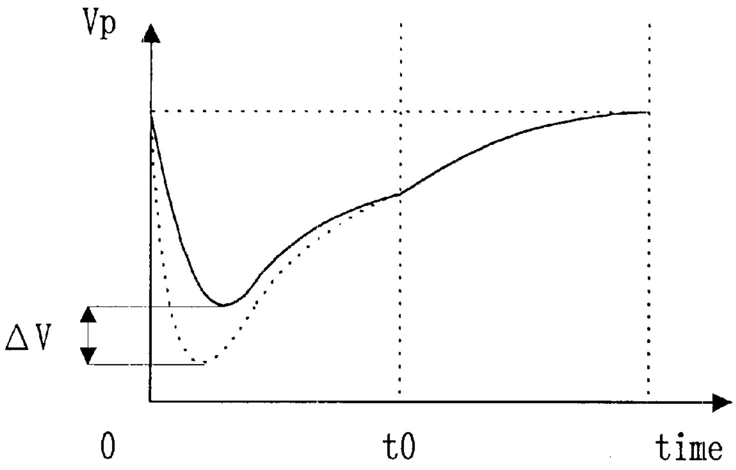
FIG. 7 is an illustration showing the changes in the battery voltage over time in the first embodiment.

FIG. 7 indicates by a solid line the changes in battery voltage Vp over time when single control is used in the period between when charging voltage Vc is 0 until time t0 when it reaches prescribed value Vco (which is smaller than final voltage Vc1) and push-pull control is used after said time t0. The changes in voltage from the start of charging when charging takes place using push-pull control is shown by a dotted line. As shown in this drawing, the battery voltage decreases significantly when charging begins, but by using single control during the period in which the load is large (until time t0), the decrease in battery voltage Vp after the commencement of charging may be mitigated by DV relative to when push-pull control is used in the same period.

Figure 9:
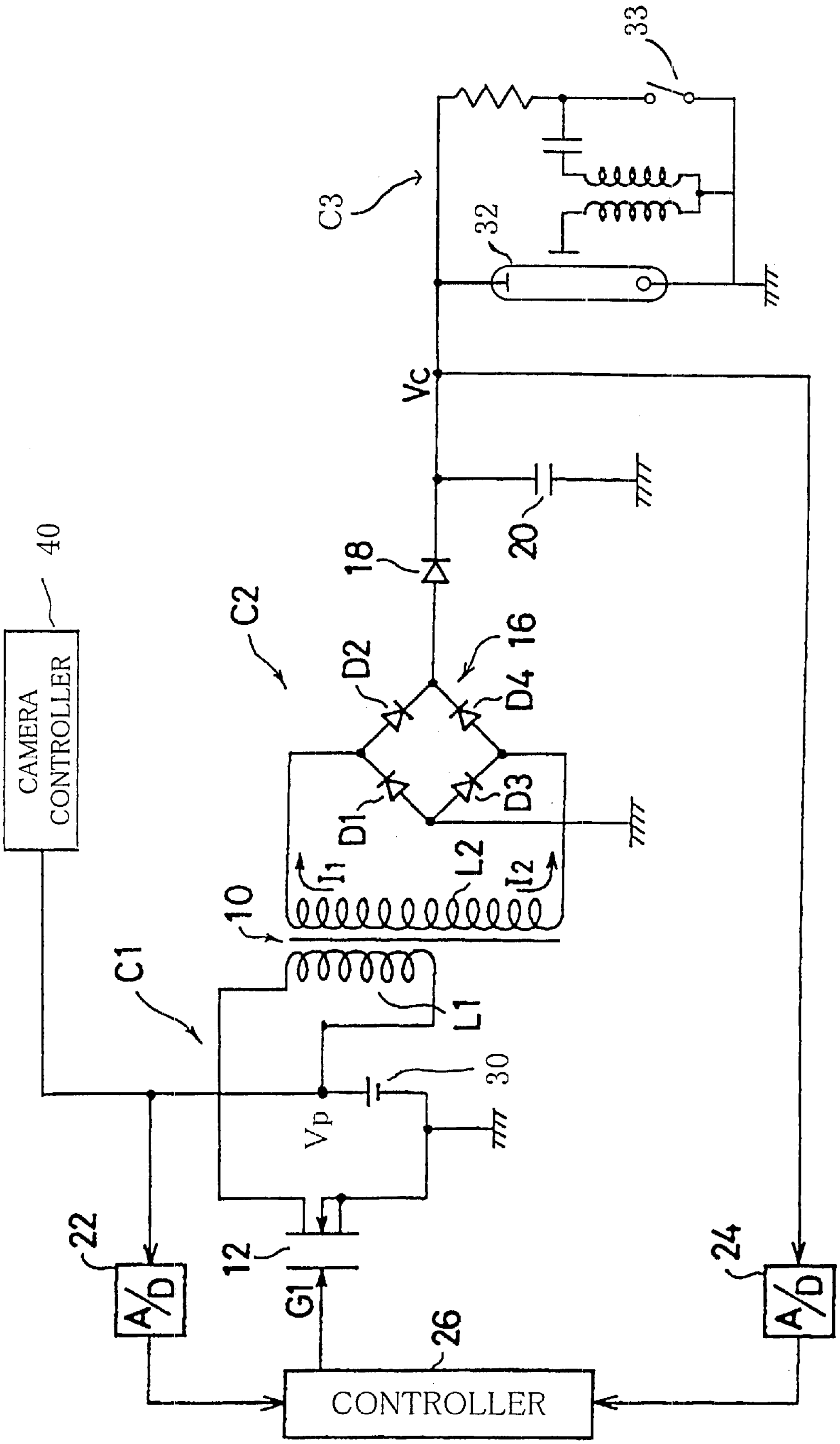
FIG. 9 is a circuit diagram showing a flash charging circuit in a second embodiment of the present invention.

A second embodiment will now be explained with reference to FIG. 9. In this embodiment, FET 14 shown in the first embodiment is omitted and a circuit construction in which single control where only FET 12 is driven ON and OFF is used at all times is used. Where battery voltage Vp is smaller than prescribed value Vpo, pulse signals having a relatively low duty ratio (33% for example) are output to gate G1, while where battery voltage Vp is equal to or larger than said prescribed value Vpo, pulse signals having a duty ratio higher than said duty ratio (50% for example) are output to gate G1 by controller 26.

By changing the period of time in which the FET is ON through switching among multiple types of pulse signals having different duty ratios, an effect in which the charging time is reduced while a decrease in battery voltage Vp is prevented may be obtained. Further, as in the first embodiment, even if battery voltage Vp is smaller than prescribed value Vpo, control takes place such that the pulse duty ratio is switched depending on whether or not the charging voltage is equal to or larger than the prescribed value through the detection of charging voltage Vc of main condenser 20. If charging voltage Vc is smaller than the prescribed value, rapid charging is not performed in order to prevent a sudden decrease in the battery voltage. In other words, FET 12 is driven using pulse signals having a relatively low duty ratio (33% for example). When charging voltage Vc becomes equal to or larger than prescribed value Vco, pulse signals having a higher duty ratio than said duty ratio (50% for example) are switched to and charging is performed using said signals.

Figure 10:
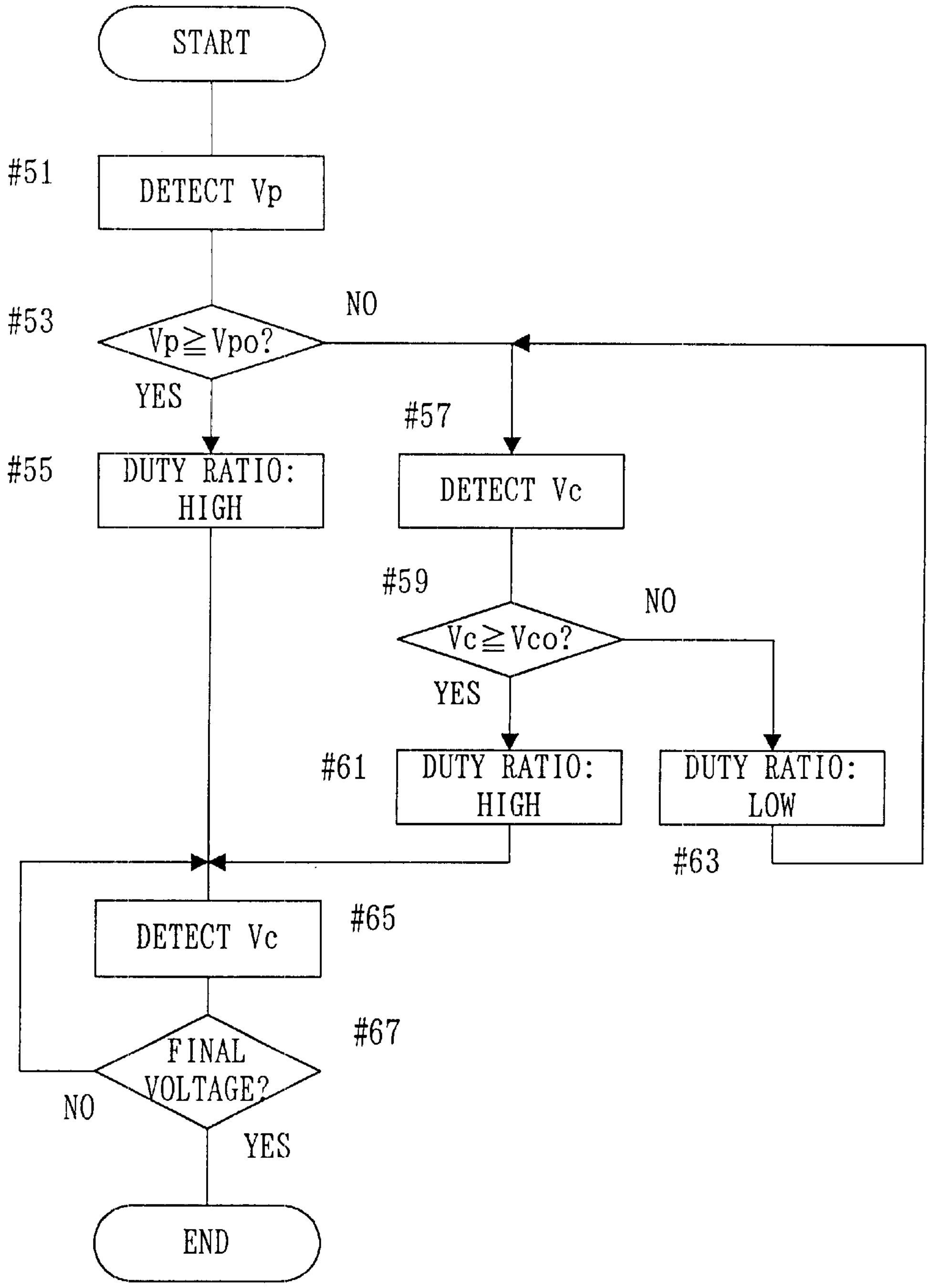
FIG. 10 is a flow chart showing the control of the charging by a controller in the second embodiment.

The control by the controller in the second embodiment is shown by the flow chart in FIG. 10. An explanation will be provided regarding differences from the flow chart showing the control of the first embodiment (FIG. 8). In the second embodiment, drive using pulse signals having a low duty ratio is performed in the step in which single control was used in the first embodiment (#63) so that a sudden decrease in battery voltage may be prevented. Regarding the steps in which push-pull control was used, drive using pulse signals with a high duty ratio (#55, #61) is performed in the second embodiment so that the charging time may be reduced.

Figure 11A:
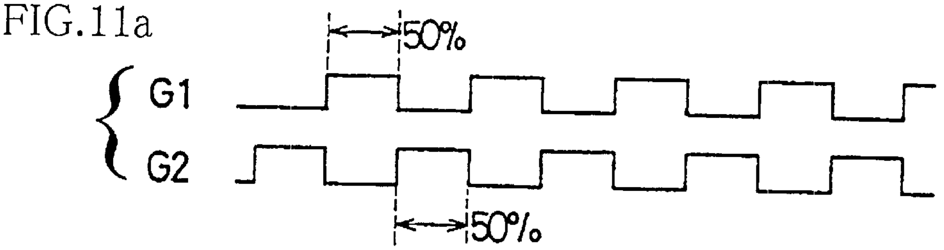
FIG. 11*a* is a waveform chart showing pulse signals that are output to the gates when the battery voltage is high in a third embodiment of the present invention.
Figure 11B:
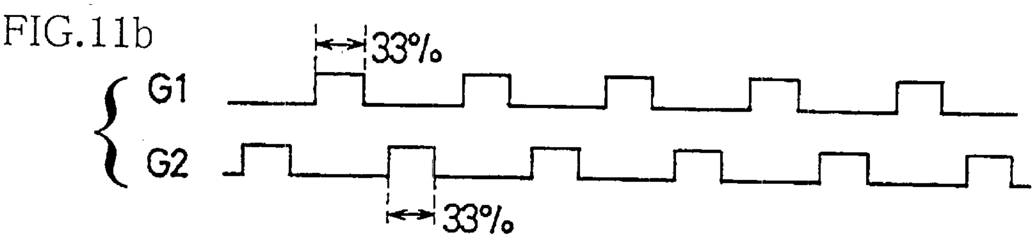
FIG. 11*b* is a waveform chart showing pulse signals that are output to the gates when the battery voltage is low in the third embodiment.
Figure 12:
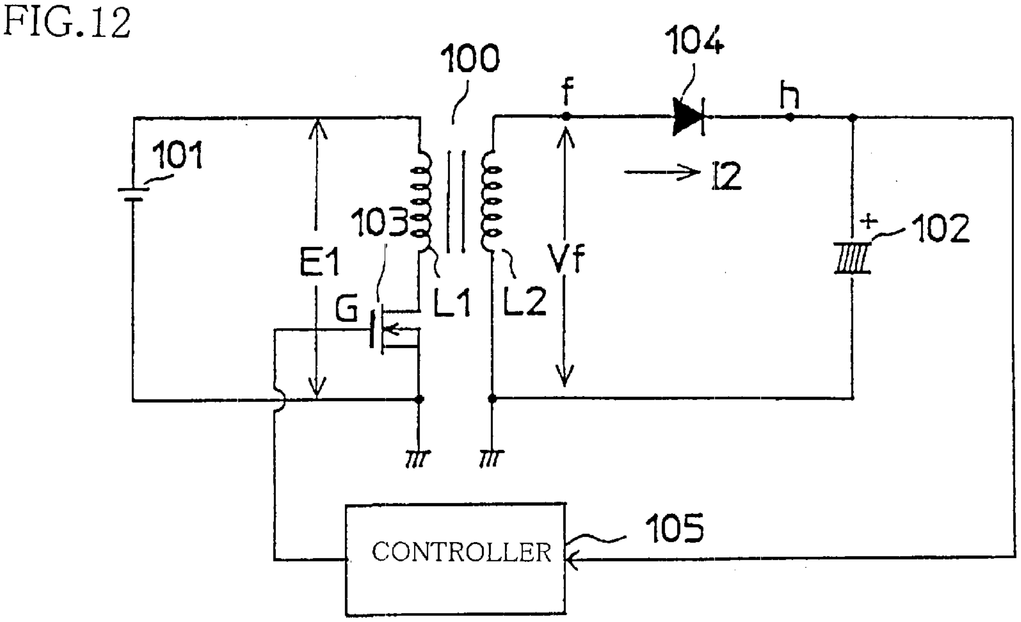
FIG. 12 is a circuit diagram showing one example of a conventional flash charging circuit.

A third embodiment will now be explained with reference to FIGS. 11*a* and 11*b*. The circuit construction of this embodiment is the same as that shown in FIG. 2, in which push-pull control where both FETs 12 and 14 are driven at all times is used. Where battery voltage Vp is equal to or larger than the prescribed value, the duty ratio of the pulse signals to gates G1 and G2 is set at a relatively large value (50% for example), as shown in FIG. 11*a*, and where battery voltage Vp is smaller than the prescribed value, the duty ratio of pulse signals to gates G1 and G2 is set at a value smaller than said duty ratio (33% for example), as shown in FIG. 11*b*. By this, the same effect obtained in the first and second embodiments may be obtained in this embodiment as well.

In addition, needless to say, in the third embodiment as well as in the first and second embodiments, a sudden decrease in the battery voltage may be prevented and the charging time may simultaneously be further reduced by having a higher duty ratio when charging voltage Vc is relatively high than when said voltage Vc is low. In this case, the duty ratio when battery voltage Vp is low and charging voltage Vc is high does not necessarily have to be identical to the duty ratio when battery voltage Vp is high. The duty ratio in this case need only be set to be larger than the duty ratio when both battery voltage Vp and charging voltage Vc are low. In terms of control by the controller, this embodiment differs from the second embodiment in that push-pull control is used, whereas signal control was used in the second embodiment, but the control may be performed using the same sequence for the control of the second embodiment shown in the flow chart in FIG. 10.

While explanations of the embodiments above were provided referring to a camera with a built-in flash in which the flash device and camera main unit are made as a single integral unit, needless to say, the present invention may be applied in a mountable flash device that is separate from the camera main unit, as well as in charging circuits and accompanying devices such as measuring devices using flash light and battery chargers.

Obviously, many modifications and variations of the present invention are possible in light of the explanation provided above. It is therefore to be understood that within the scope of the appended claims, the invention may be applied other than as specifically described.

What is claimed is:

1. A charging circuit, comprising:

a transformer which transforms a supplied voltage and supplies said transformed voltage to a load to be charged;

a switching device which is connected with said transformer; and a controller which detects a voltage which is applied from a power source to said transformer, and determines whether or not said voltage is equal to or larger than a prescribed value, and controls said switching device to switch on and off with a first duty ratio when said detected voltage is lower than said prescribed value, and with a second duty ratio higher than said first duty ratio when said detected voltage is not lower than said prescribed value, so that the charging of the load is performed in different manners.

2. A charging circuit as claimed in claim 1, wherein said controller changes a duty ratio of said switching device in accordance with said determination.

3. A charging circuit as claimed in claim 1, wherein said charging circuit has a battery which supplies power to said transformer.

4. A charging circuit as claimed in claim 1, wherein said transformer is a DC/DC converter.

5. A charging circuit as claimed in claim 1, wherein said controller also detects a charged voltage of said load.

6. A charging circuit as claimed in claim 5, wherein said controller detects a voltage which is supplied to said transformer.

7. A charging circuit, comprising:

a transformer which transforms a supplied voltage and supplies said transformed voltage to a load to be charged;

a switching device which is connected with said transformer; and a controller which detects a charged voltage of said load, and determines whether or not said voltage is equal to or larger than a prescribed value, and controls said switching device to operate with a first duty ratio when said detected voltage is lower than said prescribed value and controls said switching device to operate with a second duty ratio higher than said first duty ratio when said detected voltage is not lower than said prescribed voltage, so that the charging of the load is performed in different manners.

8. An electronic flash apparatus for photographing, comprising:

a transformer which transforms a supplied voltage;

a switching device which is connected with said transformer;

a condenser which is charged by said transformed voltage;

a first detector which detects a charge voltage of said condenser;

a second detector which detects a voltage supplied to said transformer;

a controller which controls said switching device on and off, and charges said condenser in a first mode when charge is started and then in a second mode having a faster charging speed than said first mode, in accordance with a detection by said first and second detectors.

9. An electronic flash apparatus as claimed in claim 8, wherein said electronic flash apparatus has a battery which supplies power to said transformer.

10. An electronic flash apparatus as claimed in claim 8, wherein said controller changes a duty ratio of a signal to said switching device.

11. An electronic flash apparatus for photographing, comprising:

a transformer which transforms a supplied voltage;

a switching device which is connected with said transformer;

a condenser which is charged by said transformed voltage;

a first detector which detects a charge voltage of said condenser;

a second detector which detects a voltage supplied to said transformer;

a controller which controls said switching device on and off, and controls a charge speed of said condenser in accordance with a detection by said first and second detectors, such that said controller charges said condenser in a mode in which charge speed is relatively slow when voltages detected by said first and second detectors are both lower than a prescribed value.

12. An electronic flash apparatus for photographing, comprising:

a transformer which transforms a supplied voltage;

a first switching device which is connected to said transformer to supply said voltage thereto;

a second switching device which is connected to said transformer to supply said voltage thereto;

a condenser which is charged by said transformed voltage;

a determiner which detects a voltage and determines whether or not said detected voltage is lower than a prescribed value; and a controller which controls said first and second switching devices to switch on and off in a first mode, in which both of said switching devices switch on and off, or in a second mode, in which only one of said switching devices switches on and off, in accordance with a determination by said determiner.

13. An electronic flash apparatus as claimed in claim 12, wherein said electronic flash apparatus has a battery which supplies power to said transformer.

14. An electronic flash apparatus as claimed in claim 12, wherein said determiner detects a voltage which is supplied to said transformer.

15. An electronic flash apparatus as claimed in claim 12, wherein said determiner detects a charge voltage of said condenser.

16. An electronic flash apparatus as claimed in claim 12, wherein said controller controls said first and second switching device in said second mode when said detected voltage is lower than said prescribed value and in said first mode when said detected voltage is not lower than said prescribed value.

17. A camera having an electronic flash, comprising:

a camera controller to which power is supplied from a power source and which controls an operation of said camera;

a transformer which transforms a voltage supplied from said power source;

a switching device which is connected with said transformer;

a condenser which is charged by said transformed voltage;

a determiner which detects the voltage supplied from said power source and determines whether or not said voltage is lower than a prescribed value; and a drive controller which drives said switching device to provide relatively slow charging of said condenser when said voltage is lower than said prescribed value, and to provide relatively fast charging of said condenser when said voltage is greater than said prescribed value.

18. A camera having an electronic flash, comprising:

a camera controller to which power is supplied from a power source and which controls an operation of said camera;

a transformer which transforms a voltage supplied from said power source;

a first switching device which is connected to said transformer to supply said voltage thereto;

a second switching device which is connected to said transformer to supply said voltage thereto;

a condenser which is charged by said transformed voltage;

a determiner which detects a voltage and determines whether or not said voltage is lower than a prescribed value; and a controller which controls said first and second switching devices to switch on and off in a first mode, in which both of said switching devices switch on and off, or in a second mode, in which only one of said switching devices switches on and off, in accordance with a determination by said determiner.

* * * * *